(12) United States Patent
Winans

(10) Patent No.: X8426
(45) Date of Patent: Oct. 1, 1834

(54) CAR, RAIL-ROAD

(76) Inventor: Ross Winans

Ross Winans - of Baltimore Md: - Letters Patent -
The schedule referred to in these Letters Patent and making part of the same,
containing a description in the words of the said Ross Winans himself, of his im-
provement in the construction of cars or carriages, intended to run upon Rail Roads.

To all whom it may concern:

Be it known that I, Ross Winans, Civil Engineer,
of the City of Baltimore, in the State of Maryland, have invented a new and useful
improvement in the construction of cars or carriages, intended to travel upon rail
roads, which improvement is particularly adapted to passenger cars, as will more
fully appear by an exposition of the difficulties heretofore experienced in the running
of such cars at high velocities, which exposition I think it best to give in this specifi-
-cation, for the purpose of exemplifying the more clearly the object of my said improvement.

In the construction of all railroads in this Country
which extend to any considerable distance, it has been found necessary to admit of lateral
curvatures, the radius of which is sometimes but a few hundred feet, and it becomes impor-
tant, therefore, so to construct the cars as to enable them to overcome the difficulties presented
by such curvatures, and to adapt them for running with the least friction practicable upon
all parts of the roads; the friction to which I now allude, is that which arises from the contact
between the flanches of the wheels, and the rails, which, when it occurs causes a great loss of power
and a rapid destruction of, or injury to both the wheel and the rail, and is otherwise injurious.
The high velocities attained by the improvements made in locomotive engines and which
are not only sanctioned but demanded by public opinion, render it necessary that certain
points of construction, and arrangement, both in the roads and wheels, which were not viewed passengers, and the greater its power to derange the machinery and the road.–

It becomes very important therefore, both as regards comfort, safety, and economy, to devise a mode of combining the advantages derived from placing the axles at a considerable distance apart, with those of allowing them to be situated near to each other. It has been attempted, and with some success, to correct the tendency of the flanches to come into contact with the rails, on curved and other parts of the road, by making the tread of the wheel conical, and if the travelling upon rail roads was not required to be very rapid, this would so far prove an effectual corrective, as the two rails would find diameters upon the wheels which would correspond with the difference in length, the constant tendency to deviation being as constantly counteracted by this construction; but at high velocities, the momentum of the body in motion tends so powerfully to carry it in a right line, as to cause the wheel on the longer rail, to ascend considerably above that part of the cone which corresponds therewith, the consequence of this is a continued serpentine motion principally but not entirely in a lateral direction; nor is this confined to the curved parts of the road, but it exists to an equal, or greater extent upon those which are straight, especially when the axles are near to each other, the irregularities before spoken of constantly changing the direct course of the wheels, whilst there is no general curvature of the rails to counteract it.–

To avoid this effect, and the unpleasant motion and tendency to derangement consequent upon it, an additional motive is furnished for placing the axles at a considerable distance apart. The object of my invention is, among other things, to make such an adjustment or arrangement of the wheels and axles, as shall cause the body of the car or carriage to pursue a more smooth, even, direct, and safe course, than it does as cars are ordinarily constructed, both over the curved and straight parts of the roads, by the before mentioned desideratum of combining the advantages of the near and distant coupling of the axles, and other means to be hereinafter described.–

For this purpose I construct two bearing carriages each with four wheels, which are to sustain the body of the passenger, or other car, by placing one of them at or near each end of it in a way to be presently described. The two wheels on either side of these carriages are to be placed very near to each other; the spaces between their flanges need be no greater than is necessary to prevent their contact with each other. These wheels I connect together by means of a very strong spring, say double the usual strength employed for ordinary cars, the ends of which springs are bolted, or otherwise se=cured to the upper sides of the boxes which rest on the journals of the axles, the longer leaves of the springs being placed downwards and surmounted by the shorter leaves.—

Having thus connected two pairs of wheels together I unite them into a four wheeled bearing carriage, by means of their axles and a bol-ster of the proper length extending across between the two pairs of wheels, from the center of one spring to that of the other, and securely fastened to the tops of them. This bolster must be of sufficient strength to bear a load upon its center of four or five tons.— Upon this first bolster I place another of equal strength, and connect the two together by a center pin or bolt, passing down through them, and thus allowing them to swivel or turn upon each other in the manner of the front bolster of a common road wagon. I prefer making these bolsters of wrought or cast iron: wood, however, may be used. I prepare each of the bearing carriages in precisely the same way.—

The body of the passenger or other car I make of double the ordinary length of those which run on four wheels, and capable of carry=ing double their load.—

This body I place so as to rest its whole weight upon the two upper bolsters of the two beforementioned bearing carriages or running gear. I sometimes place these bolsters so far within the ends of the body of the car as to bring all the wheels under it, and, in this case, less strength is necessary in the carriage body, than when the bolster is situ=ated at its extreme ends. In some cases, however, I place the bolster so far without the body of the car at either end, as to allow the latter to hang down between the two sets of wheels, or bearing carriages and to run if desired, within a foot of the rails.—

When this is done a strong frame work projects out from either end of the car or carriage body, and rests upon the upper bolsters of the two bearing carriages. This last arrangement by which the body of the car is hung so low down, manifestly affords a great security to the passengers, exempting them in a great degree from those accidents to which they are liable when the load is raised. Several bodies may be connected, or rest on a common frame, and be supported on the bearing carriages, in a manner similar to that of a single body.

When the bolsters of the bearing carriages are placed under the extreme ends of the body, the relief from shocks, and concussions, and from lateral vibrations, is greater than it is when the bolsters are placed between the middle and the ends of the body, and this relief is not materially varied by increasing or diminishing the length of the body, while the extreme ends of it continue to rest on the bolsters of the bearing cars the load being supposed to be equally distributed over the entire length of the body.

Although I prefer the use of a single spring to a pair of wheels as above described, instead of the ordinary spring to each wheel, and consider it as more simple, cheap, and convenient, than any other arrangement, the end which I have in view may nevertheless be obtained by constructing the bearing carriages in any of the modes usually practised, provided that the fore and hind wheels of each of them be placed very near together, because the closeness [illegible] of the fore and hind wheels of each bearing carriage, taken in connection with the use of two bearing carriages coupled remotely from each other as can conveniently be done for the support of one body, with a view to the objects and on the principles herein set forth, is considered by me as a most important feature of my invention, for by the contiguity of the fore and hind wheels of each bearing carriage, while the two bearing carriages may be at any desirable distance apart, the lateral friction from the rubbing of the flanches against the rails, is most effectually avoided, whilst at the same time, all the advantages attendant upon placing the axles of a [illegible] car far apart are thus obtained.

The bearing of the load on the center of the bolster, which also is the center of each bearing carriage, likewise affords great relief from the shocks occasioned by the percussions of the wheels on protuberant parts of the rails, or other objects, and from the vibrations consequent to the use of coned wheels, as the lateral and vertical movements of the body of the car resulting from the above causes are much diminished. The two wheels on either side of one of the bearing carriages may, from their proximity, be considered as acting like a single wheel, and as these two bearing carriages may be placed at any distance from each other, consistent with the required strength of the body of the car, it is evident that all the advantage is obtained which results from having the two axles of a four wheeled car at a distance from each other, whilst its inconveniences are avoided.—

Another advantage of this car compared with those in common use, and which is viewed by me as very important, is the increased safety afforded by it to passengers, not only from the diminished liability to breakage, or derangement in the frame work, but also from the less disastrous consequences to be ap- -prehended from the breaking of a wheel, axle or other part of the running gear, as the car body depends for its support and safety upon a greater number of wheels, & bearing points on the road.

I do not claim, as my invention, the running of cars or carriages upon eight wheels, this having been previously done; not, however, in the manner or for the purposes herein described, but merely with a view of distributing the weight carried, more evenly upon a rail, or other road, and for objects distinct in character from those which I have had in view, as herein before set forth. Nor have the wheels when thus increased in number, been so arranged and connected with each other either by design or accident, as to accomplish this purpose.

What I claim, therefore, as my invention, and for which I ask a Patent, is the before described manner of arranging and connecting the eight wheels which constitute the two bearing carriages with a rail road car, so as to accomplish the end proposed by the means set forth, or by any others which are analogous and dependent upon the same principles.

Witnesses
G. Brown
Jn. H. B. Latrobe

Ross Winans.

Patent Office, Dec. 28. 1854 2405 [illegible]

Rec.d Dec. 21. 1854. & on account of alleged errors in the record, recorded again [illegible]

C. Mason,
Commissioner of Patents